Oct. 25, 1955
E. BERG
2,721,459
ANTIDRIP DEVICES FOR COFFEE CUPS AND THE LIKE
Filed Aug. 4, 1953
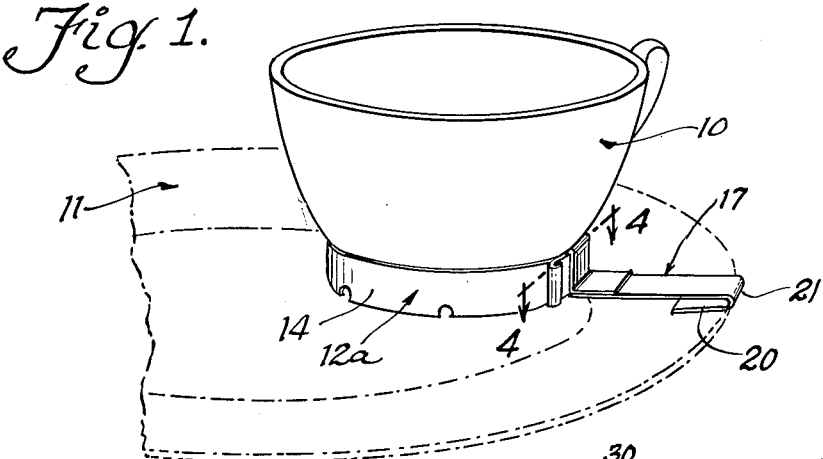
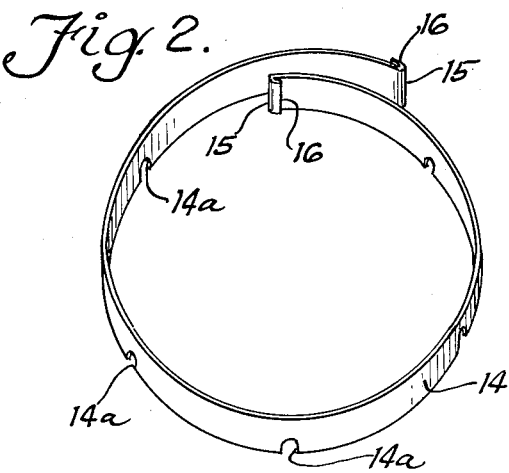
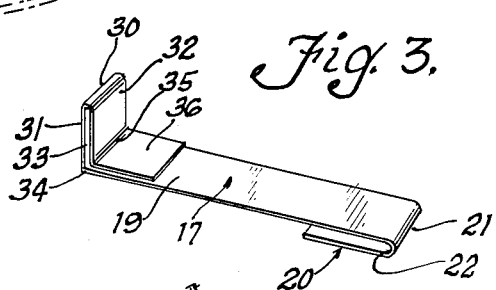
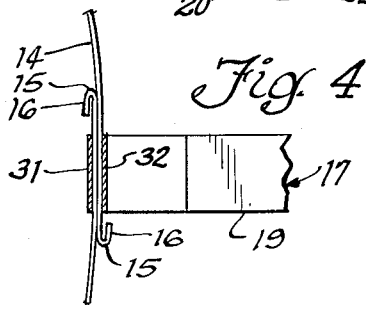
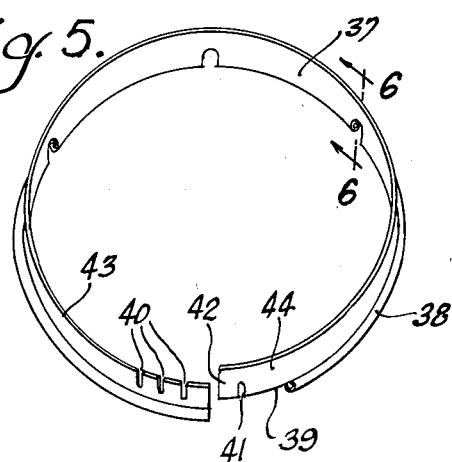
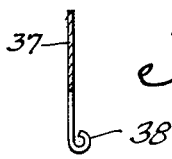
INVENTOR.
Elaine Berg
BY
Robert H. Wendt
Att'y

United States Patent Office 2,721,459
Patented Oct. 25, 1955

2,721,459

ANTIDRIP DEVICES FOR COFFEE CUPS AND THE LIKE

Elaine Berg, Chicago, Ill., assignor of one-third to Robert H. Wendt, Evanston, and one-third to Faith P. Peters, Chicago, Ill.

Application August 4, 1953, Serial No. 372,302

3 Claims. (Cl. 65—65)

The present invention relates to anti-drip devices for coffee cups and the like, and is particularly concerned with the provision of an improved device for supporting a cup in a saucer in such manner that spillage or drip is drained away from the cup, and the cup is maintained in a dry condition.

The present application is a continuation in part of my prior application, Serial No. 244,665, filed August 31, 1951, Patent No. 2,657,559, issued on November 3, 1953.

One of the objects of the invention is the provision of an improved anti-drip device for cups and the like which supports the cup in spaced relation to the bottom of the saucer in a firm and stable manner so that the drip may run down into the saucer; and the cup may be kept out of contact with any spillage or drip.

Another object of the invention is the provision of a device of the class described which is so constructed that they may be stacked and so that cups and saucers full of coffee or the like may be stacked and carried with the anti-drip devices in the assembly.

Another object of the invention is the provision of an improved device of the class described which is simple, capable of economical manufacture, attractive in appearance, and which does not detract in any way from the appearance of the cup and saucer assembly, appearing to be practically invisible.

Another object of the invention is the provision of a plurality of forms of the anti-drip device which are adjustable in size, so that they are adapted to be used with cups of different sizes and so that a single device may supply the needs of the public in regard to coffee cups of various sizes.

Other objects and advantages of the invention will be apparent from the following description and the accompanying drawings, in which similar characters of reference indicate similar parts throughout the several views.

Referring to one sheet of drawings accompanying the specification,

Fig. 1 is a view in perspective of a construction in which the anti-drip device is adjustable in size;

Fig. 2 is a view in perspective of the circular part of the anti-drip device of Fig. 1;

Fig. 3 is a view in perspective of the handle of the device of Fig. 1;

Fig. 4 is a fragmentary sectional view taken on the plane of the line 10—10 of Fig. 1, looking in the direction of the arrows, and showing the details of attachment of the handle to the circular collar;

Fig. 5 is a view in perspective of a modification;

Fig. 6 is a fragmentary sectional view taken on the plane of the line 12—12 of Fig. 5.

The present anti-drip device may be made out of transparent plastic material or out of cardboard impregnated with a suitable wax or other water proofing agent; and one of the preferred forms of the device is shown in Fig. 1.

This anti-drip device 12a consists of a simple ring of transparent plastic material, such as thin sheets of "Lucite," "Plexiglass" or wax impregnated cardboard; which are flexible enough to be bent to cylindrical or conical form and stiff enough to maintain that shape.

The ring is preferably provided with a plurality of downwardly open grooves 14a in its lower edge for facilitating the drainage of drippings. Each end of the ring 14 is preferably turned back upon itself at 15 to form a spaced backwardly extending portion 16, which is parallel and which forms an open hook.

The ring is preferably provided with a handle or locating member 17, as shown in Fig. 3, and this consists of a strip of the same material which has its outer end bent back upon itself at 21 to form a hook 20 which engages over the outer edge of a plate or saucer 11, as shown in Fig. 1. The hook has an easy bend on the inside at 22 so that it fits over the edge of the saucer.

The length of the handle 17 is preferably such so that when the hook is located at the edge of the saucer the ring 14 is centrally located in a saucer or located at one edge of the flat part of a plate.

The other end of the handle is folded back on itself at 30 and provided with two spaced vertical portions 31 and 32, between which there is a slot 33 wide enough and high enough to receive the end portions of the ring 14, these being clamped rather tightly by the flanges 31, 32 which hold the ring in any adjusted size.

The left end of handle 17 is bent upward at right angles at 34, and the flange 32 is bent at right angles at 35 and is arranged to be adhesively secured by means of a tab 36 to the shank 19 of the handle, by means of cement or by integrally welding these two parts together.

Before securing the parts 36 and 19 together the ends 15 of the ring are inserted in the slot 33, with one hook 16 facing inwardly and the other hook 16 facing outwardly. These hooks are then adapted to hook about the edges of the flanges 31, 32, and to prevent removal of the ring from the handle.

The ring may be adjusted to any size of coffee cup by merely pushing its free ends 15 in such manner as to make the ring smaller or larger. The size of the ring is preferably such that it is larger than the supporting rim 25 of the cup 10, so that the cup fits well down into the ring but has its bottom above the drippage.

Making the ring larger than the supporting rim of the cup gives the cup greater stability in the ring. When the anti-drip device is made of transparent sheet material, it is practically invisible; and the color of the cup and saucer assembly predominates so that the present device does not detract at all from the appearance of a set of dishes. The cup merely appears to be suspended in midair above the drip or on the transparent collar.

Referring to Figs. 5 and 6, these are views of a modification in which the ring 37 is without a handle and is preferably formed along its lower edge with a bead or roll 38. This bead or roll 38 is cut away from the ring 37 along one end portion 39 to permit the convenient adjustment in size of the ring.

One end of the ring 37 has a plurality of top-open slots 40 which extend half way from top to bottom of the ring. The other end of the ring has a bottom-open slot 41 extending half way toward the top. This leaves a tab 42 on the end portion which can be located inside the end portion 43 by pressing the slot 41 downward in registry with one of the slots 40.

The portion 44 of the ring end will then be located outside of the portion 43 of the other ring end, and the ring may be made of any size, selecting the proper slot 40. This ring may be made frusto-conical in form so that it will nest with the other similar rings, and it may be made of plastic which is transparent or opaque, white or colored or of wax impregnated cardboard.

It will thus be observed that I have invented a plurality of forms of anti-drip devices for cups and saucers, any one of which is adapted to hold the cup in spaced relation to the bottom of the saucer, out of contact with drippage and spillage. Thus the bottom of the cup is substantially dry; and the drip does not fall upon the tablecloth or clothing of the user.

The present devices, when made of frusto-conical form, can be nested inside each other and stacked; and being transparent, they are practically invisible when disposed between the cup and saucer. For example, a blue cup and saucer is visible through the ring; and the ring merely supports the cup without detracting from the color or appearance of the assembly.

The handle also serves the useful purpose of permitting the waitress to handle the saucer with her thumb above the handle and forefinger below it, without physically touching the saucer. The saucer may be maintained in a sanitary condition so that the spillage is also sanitary and may be poured back in the cup.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An anti-drip device for supporting a cup in a plate comprising a strip of relatively stiff, flexible material bent into substantially cylindrical shape forming a ring and having its ends overlapping, the said strip being of sufficient width to support a cup with its bottom in spaced relation to said plate, and a handle member comprising a strip of similar material formed at one end with a backwardly extending hook formation to engage over the edge of the plate and to keep the fingers of the server out of contact with the plate, the other end of said handle strip being provided with an upwardly extending portion bent backward upon itself, and having its free end secured to the strip and forming a narrow slot of sufficient width and height to receive the overlapping ends of said ring which are engaged frictionally by said handle and held in any adjusted position to form an adjustable ring of suitable diameter for any of a plurality of sizes of cups.

2. An anti-drip device for supporting a cup in a plate comprising a strip of relatively stiff, flexible material bent into substantially cylindrical shape forming a ring and having its ends overlapping, the said strip being of sufficient width to support a cup with its bottom in spaced relation to said plate, and a handle member comprising a strip of similar material formed at one end with a backwardly extending hook formation to engage over the edge of the plate and to keep the fingers of the server out of contact with the plate, the other end of said handle strip being provided with an upwardly extending portion bent backward upon itself, and having its free end secured to the strip and forming a narrow slot of sufficient width and height to receive the overlapping ends of said ring which are engaged frictionally by said handle and held in any adjusted postion to form an adjustable ring of suitable diameter for any of a plurality of sizes of cups, the said ring having its overlapping ends formed with backwardly turned hooks engaging said handle and maintaining the assembly of the ring and handle.

3. In an anti-drip device for coffee cups and the like, the combination of a strip of flexible material forming a hook-shaped handle for fitting over the edge of a plate, said strip being formed with a vertically extending, flattened loop at its other end for receiving a ring of flat material, a ring of flexible material comprising a strip having both its ends slidably secured by friction in said loop, said ring having each end provided with a backwardly turned hook engaging said loop to retain the ends of the ring in the loop, and said latter hooks being oppositely turned, said ring being of sufficient width to space a cup from drippings in the saucer, and of sufficient diameter to receive the bottom supporting ring of a cup, and being adjustable in diameter and frictionally held in adjusted position by said loop.

References Cited in the file of this patent

UNITED STATES PATENTS

| Number | Name | Date |
|---|---|---|
| Re. 20,789 | Bergstein | July 12, 1938 |
| 117,766 | Gibson, Jr. | Aug. 8, 1871 |
| 799,381 | Hope | Sept. 12, 1905 |
| 1,229,226 | Cary | June 12, 1917 |
| 1,614,338 | Awoki | Jan. 11, 1927 |
| 1,657,664 | Dexter | Jan. 31, 1928 |
| 1,999,796 | Zinser | Apr. 30, 1935 |
| 2,059,769 | Bell | Nov. 3, 1936 |
| 2,107,381 | Leppke | Feb. 8, 1938 |
| 2,117,266 | Adams | May 17, 1938 |
| 2,224,421 | Aaron | Dec. 10, 1940 |
| 2,427,697 | Weidler | Sept. 23, 1947 |
| 2,518,368 | Peters | Aug. 8, 1950 |
| 2,657,559 | Berg | Nov. 3, 1953 |

FOREIGN PATENTS

| Number | Country | Date |
|---|---|---|
| 3,462 | Great Britain | Mar. 6, 1888 |
| 22,757 | Great Britain | Nov. 7, 1905 |